United States Patent [19]
Popp

[11] Patent Number: 5,659,137
[45] Date of Patent: Aug. 19, 1997

[54] DECELEROMETER

[75] Inventor: William R. Popp, Pittsburgh, Pa.

[73] Assignee: Union Switch & Signal Inc., Pittsburgh, Pa.

[21] Appl. No.: 694,733

[22] Filed: Aug. 9, 1996

[51] Int. Cl.$^6$ .................................. G01P 15/12; G01C 9/06
[52] U.S. Cl. ................................................ 73/514.09; 33/366
[58] Field of Search ............................ 73/514.01, 514.09, 73/514.36, 514.37; 33/366, 391, 401

[56] References Cited

U.S. PATENT DOCUMENTS

| | | | |
|---|---|---|---|
| 2,893,134 | 7/1959 | Shea et al. | 33/366 |
| 3,490,153 | 1/1970 | Harris | 33/366 X |
| 3,776,044 | 12/1973 | Syria | 73/514.09 |
| 3,955,398 | 5/1976 | Watson et al. | 73/1 D |
| 4,676,103 | 6/1987 | Nakajima | 73/514.09 |
| 4,707,927 | 11/1987 | Hiyama | 73/514.09 |

*Primary Examiner*—Michael Brock
*Attorney, Agent, or Firm*—Kevin A. Sembrat

[57] ABSTRACT

A decelerometer is provided for detecting and measuring inertial deceleration and acceleration of a vehicle moving in a first direction and alternatively moving in a second direction which opposes the first direction. The decelerometer uses a tilt sensor which changes voltage as the tilt sensor is rotated clockwise or counter clockwise or is otherwise tilted from a level position. Two voltage outputs from the tilt sensor are processed to convert from AC to DC and from DC to digital information, which subsequently is processed by a processing unit for decisions to be made relative to accelerating, decelerating, and braking of the vehicle.

22 Claims, 2 Drawing Sheets

DECELEROMETER

BACKGROUND OF THE INVENTION

1. Field of the Invention

The present invention relates generally to inertia type decelerometers and, more particularly, to microprocessor based inertia type decelerometers which make use of sensor means for detecting and measuring acceleration and deceleration of a vehicle in dual direction applications.

2. Description of the Related Art

In the related art, decelerometers utilize a mercury filled glass tube as a deceleration sensing device. The mercury filled glass tube is fragile and frequently broken, thereby releasing the hazardous fluid. Decelerometers of this mercury filled glass tube type only provide a closed switch indication of deceleration. In dual direction applications, two devices are required.

In the railroad industry in particular, microprocessor cab signal equipment has been using a mercury tube decelerometer to indicate pre-set brake rates. Two devices per railroad vehicle or locomotive are required—one for each direction of motion that is traveled along a railroad track. The principle of operation of the mercury tube decelerometer is that the mercury, due to its inertia, is caused to move within the confines of the glass tube when under the influence of deceleration. When the deceleration rate is sufficiently high, the mercury comes in contact with two electrical contacts in the glass tube and then an electrical circuit is completed, thereby sending a control signal to the system logic. In this manner, the mercury functions as a switch that closes at a predetermined deceleration rate. As a result, the decelerometer provides only a single rate of acceleration or deceleration depending upon when the mercury functioned as a switch that closed the two electrical contacts within the glass tube.

SUMMARY OF THE INVENTION

It is accordingly one object of the present invention to provide a decelerometer that eliminates the need for a mercury filled glass tube.

Another object of the present invention is to provide a decelerometer which responds in a linear fashion to acceleration and deceleration of a vehicle, thereby providing an incremental measurement of the actual amount of rate of acceleration and deceleration of the vehicle in a first direction.

Still another object of the invention is to provide a decelerometer which measures rates of acceleration and deceleration in the first direction and in an opposing second direction.

Still another object of the present invention is to provide a decelerometer that is used as a fail safe device utilizing software checks to maintain vitality in railroad applications.

It is a feature of the present invention to measure the inertial rate of acceleration and deceleration of a vehicle with an electrolytic tilt sensor that provides first and second voltage outputs related to a degree of tilt from a level position.

It is another feature of the present invention to digitally process the voltage outputs provided by the tilt sensor.

In accordance with a preferred embodiment, a decelerometer for use in a vehicle is provided, comprising: exciting source means for supplying electrical energy; sensor means responsive to the electrical energy for measuring a rate of acceleration and a rate of deceleration of the sensing means in a first direction and in an opposing second direction, wherein said sensing means provides first and second voltage outputs related to a degree of tilt from a level position; and processing means for processing the first and second voltage outputs in order to verify movement of the vehicle.

Another preferred embodiment of the present invention utilizes a tilt sensor that behaves in similar fashion to a potentiometer, wherein the resistance between a center contact and end contacts of the tilt sensor varies as the sensor is tilted relative to a level position, such as when the tilt sensor experiences inertial acceleration or deceleration. The wiper contact in the center of the tilt sensor is connected to ground so that the voltage at the ends of the sensor rise and fall in response to the tilt angle. As the tilt angle increases, the voltage at one end of the sensor increases while the voltage at the other end decreases. As such, the sensor functions as a dual directional device, and provides both acceleration and deceleration signals. The acceleration and deceleration signals from the tilt sensor are digitally processed for interpretation by an electrically connected processing unit which verifies movement of the vehicle and provides output signals to control the safe movement of the vehicle. In addition, the processing unit coordinates cycle checks and other software checks which are necessary to maintain the vitality of the decelerometer, wherein a brake application is applied to slow or stop the vehicle in the event a component failure is detected by the processing unit.

An advantage of the present invention is that a single decelerometer may be used in a dual direction operation for providing outputs for both acceleration and deceleration, depending direction of travel of the vehicle.

Another advantage of the present invention is that vital circuits are not required due to vitality checks provided by software processed by the processing unit.

Another advantage of the present invention is that the sensing device contains no hazardous fluids.

Another advantage of the present invention is that the decelerometer is able to withstand the shock and vibration experienced from railroad vehicles.

Another advantage of the present invention is that inertial forces below 0.14 g may be detected.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
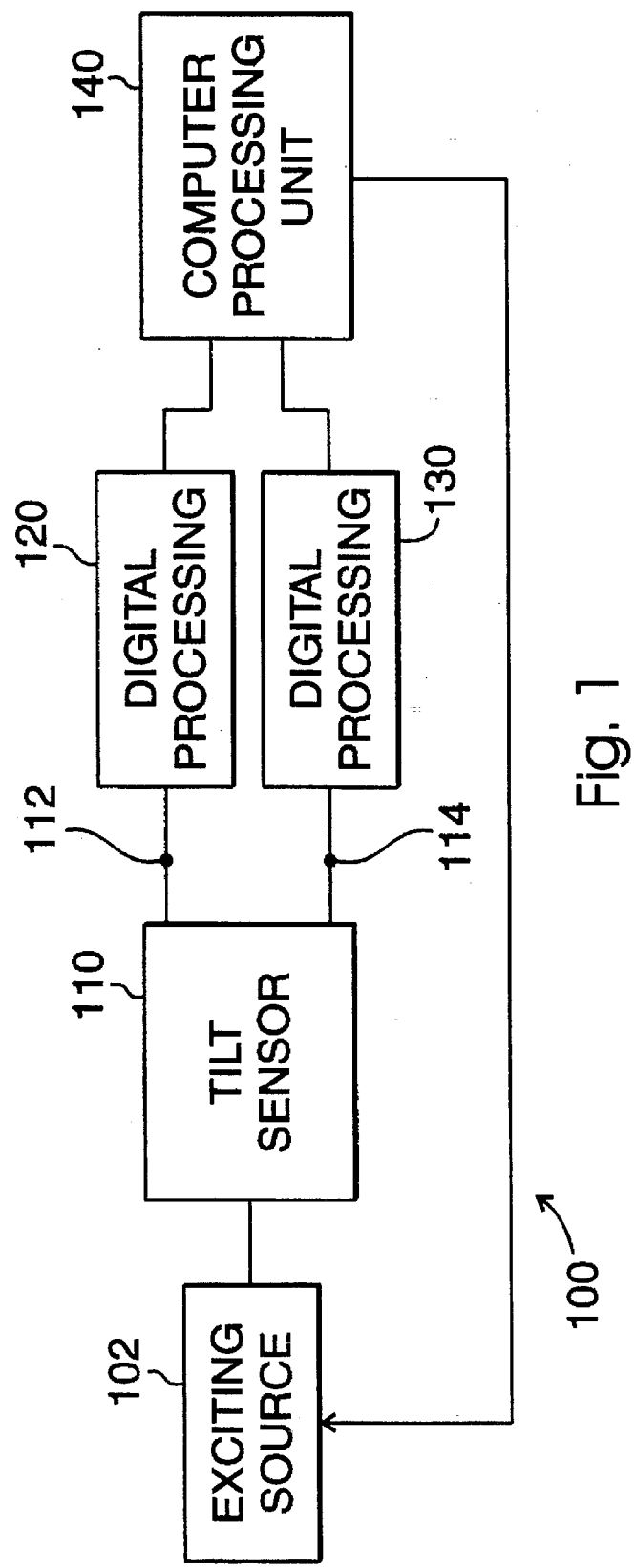
FIG. 1 is a general functional block diagram of a decelerometer in accordance with a preferred embodiment of the present invention.

Referring now to FIG. 1, a general functional block diagram of a decelerometer 100 is shown, according to the present invention. It is understood that the blocks represent functions in accordance with the designation within the block. Further, connecting lines represent flow of control or actuating signals and do not necessarily designate all electrical connections. For instance, as is known in the art, certain supply voltages, ground connections, resistances and capacitances, although not shown, are necessary for proper functioning of the decelerometer 100.

An exciting source 102, such as a battery or other power supply means, for instance, provides electrical energy, preferably in the form of alternating current, to an electrically connected tilt sensor 110. The tilt sensor 110 provides voltage outputs 112, 114 that vary in voltage as the tilt sensor 110 is rotated clockwise and counter clockwise, or is otherwise tilted relative to an initial level position. The voltage outputs 112, 114 are each digitally processed by digital processing blocks 120, 130, respectively for subsequent input to an electrically connected processing unit 140. The processing unit 140 is electrically gated to the exciting source 102, thereby to power the decelerometer 100 on and off in accordance with voltage outputs 112 and 114 from the tilt sensor 110, and in accordance with well-known cycle checks and other software checks (not shown) coordinated by the processing unit 140.

Figure 2:
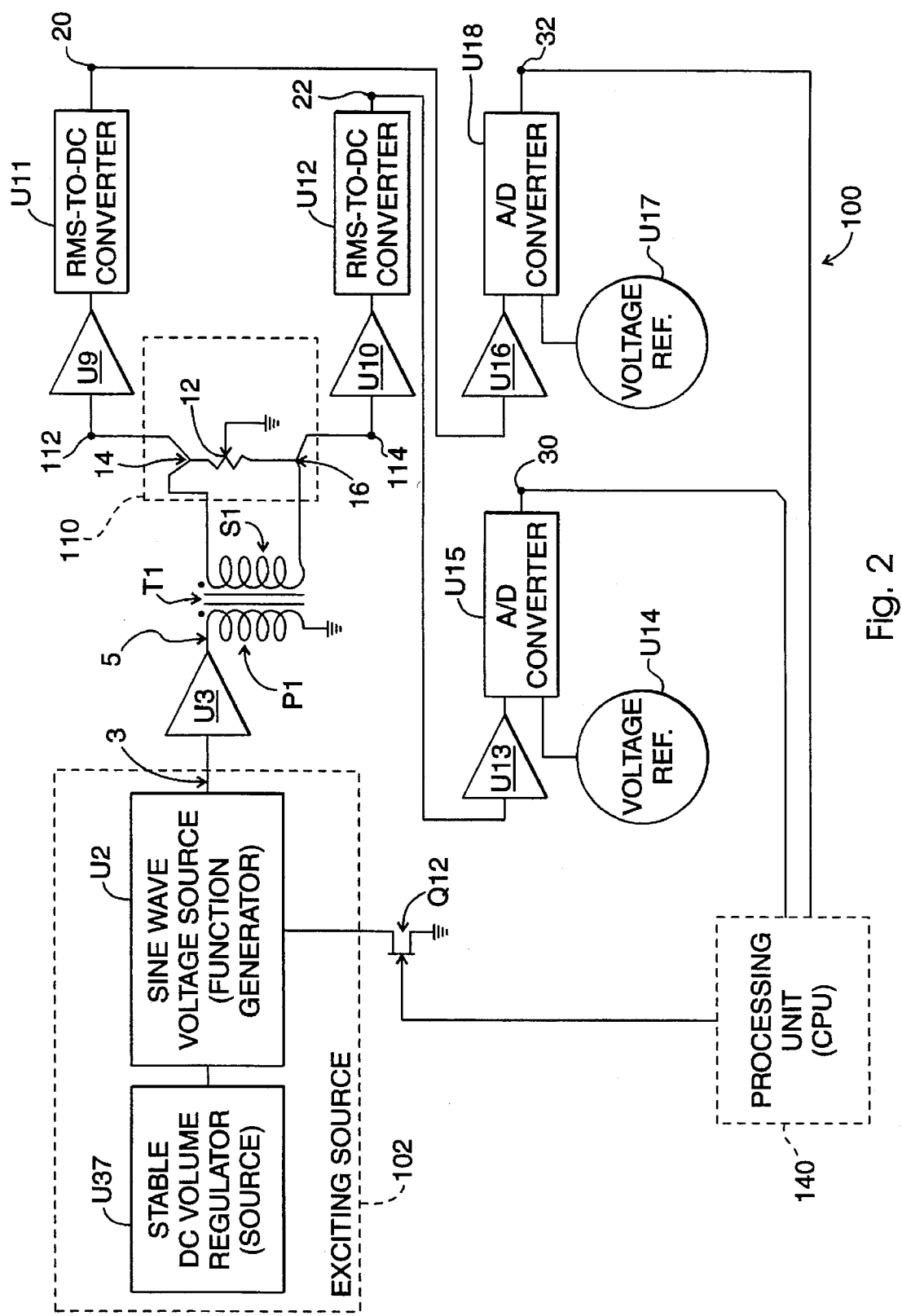
FIG. 2 is a schematic block diagram of a decelerometer in accordance with the preferred embodiment of the present invention, wherein the processing unit is shown as a functional block.

FIG. 2 shows a schematic block diagram of the decelerometer 100 according to a preferred embodiment. The exciting source 102 comprises a stable DC voltage regulator U37, typically part number LM117, for instance, that is electrically connected to a stable sine wave voltage source (function generator) U2, preferably operating at approximately 6000 Hz, and typically part number 80388MJD, for instance, thereby to produce AC power for the decelerometer 100. The voltage source U2 is gated off through the FET Q12 as part of a cycle check function, which cycle check function is well-known in the art and therefore is not described here. Gating the voltage source U2 through the FET Q12 with the processing unit 140 electrically coupled thereto, permits the processing unit 140 to conduct a cycle check on a non-busy cycle of the processing unit 140, wherein the processing unit 140 forces an output signal 3 of the voltage source U2 to zero by turning the FET Q12 gate off and confirming that the output in fact went to zero. Subsequently, the processing unit 140 turns the gate of the FET Q12 back on and confirms that the output signal 3 of the voltage source U2 has not changed.

The voltage source U2 is electrically coupled to an operational amplifier U3 which has a gain determined by an appropriate selection of values for a pair of resistors (not shown) connected in series to a negative input (not shown) of the amplifier U3, as is well-known in the art. An amplified output signal 5 drives the tilt sensor 110 through a transformer T1. Transformer T1 has an 18 millimeter Ferromagnetic material pot core with a primary winding P1 and a secondary winding S1 and having a 1:1 turns ratio. The secondary winding S1 provides voltage for the tilt sensor 110 and DC isolation. A preferred voltage provided for the tilt sensor is 4 volts root-mean-square (RMS).

The tilt sensor 110 is electrically coupled to the secondary winding S1 of the transformer T1 and behaves similar to a potentiometer (not shown) wherein the resistance between the wiper contact 12 and the first end contact 14 and the second end contact 16 varies as the tilt sensor 110 is tilted, relating to inertia during acceleration and deceleration. In this embodiment, the wiper contact 12 of the tilt sensor 10 is connected to ground so that the voltage at each end contact 14, 16, relative to ground, rises and falls in response to the tilt angle (not shown) resulting from an acceleration or deceleration. As an increase in acceleration or deceleration increases the tilt angle, the voltage at one end of the sensor 10 increases while the voltage at the opposing end decreases.

The voltage outputs 112, 114 of end contacts 14, 16 are buffered by follower operational amplifiers U9, U10, respectively, before being applied to RMS-to-DC converters U11, U12, respectfully, which converters provide a 1:1 RMS to DC conversion of the voltage outputs from end contacts 14, 16, respectively. Amplifiers U13, U16 are electrically coupled to the RMS-to-DC converters U11, U12, respectively, thereby to buffer and amplify voltage outputs 20, 22 from the RMS-to-DC converters U11, U12, respectively, in accordance with a gain determined by appropriate selections of values for pairs of resistors (not shown) connected in series to a negative input (not shown) of each of the amplifiers U13, U16, as is well-known in the art. A preferred amplification provided by amplifiers U13, U16 is 2.5.

Analog-to-digital (A/D) converters U15, U18 are electrically coupled to the amplifiers U13, U16, respectively, thereby to convert the DC signal from amplifier U13, U16, to digital information in accordance with electrically coupled voltage references U14, U17 for the respective A/D converters U15, U18, in a manner which is well known in the art. A preferred embodiment of the A/D converters U15, U18 are set up for −10 volt references and divide by 256. The CPU 140 is electrically coupled to receive the converted digital information from the A/D converters U15, U18.

A preferred embodiment of the tilt sensor 110 is a 12 degree device manufactured by Spectron Glass and Electronics, Inc. under their part number GC-57S. The sensor 110 is preferably mounted in a separate mechanical assembly (not shown) that permits the sensor 110 to be leveled with respect to the vehicle (not shown).

2. Operation of the Preferred Embodiment

In operation, the tilt sensor 110 operates such that the summation of the voltage output 112 and the voltage output 114 is equal to a constant K, wherein K is a maximum value according to a non-fault (safe) operation. In accordance with a cycle check or other check coordinated by the processing unit 140, when the tilt sensor 110 is powered off by the processing unit 140, then the summation of the voltage output 112 and voltage output 114 is equal to zero, which is a non-fault (safe) operation. When the tilt sensor 110 is subsequently powered on again by the processing unit 140, then the summation of the voltage output 112 and the voltage output 114 is equal to the constant K for the non-fault (safe) operation.

The tilt sensor 110 is adjusted until the outputs 30, 32 of the A/D converters U15, U18 are equal at a time when the vehicle is setting in a level position, such as on level track. When adjusted, the sensor 110 is level and the voltage at each end contact 14, 16 is equal. In the level position, the voltage at each of the end contacts 14, 16 is 5.0 volts. As the vehicle accelerates or decelerates, the voltage at one end of the sensor 110 increases as the voltage at the opposing end decreases. By monitoring the voltage at the end contacts 14, 16 with the A/D converters U15, U18, respectively, a measure of deceleration in the form of either increasing or decreasing voltage, is obtained.

When the tilt sensor 110 is leveled by mechanical means (not shown) until the end contact 14, 16 outputs are equal, thereby making the outputs 30, 32 of the A/D converters U15, U16 equal, the deceleration rate is zero and the tilt sensor 110 is normalized to the locomotive or railway vehicle (not shown). When the locomotive or railway vehicle is caused to decelerate, the decelerometer 100 produces an output that is compared to previously programmed deceleration rates (not shown) provided to the processing unit 140. Similarly, a measure of acceleration is provided with a negative output that is compared to previously programmed acceleration rates.

When the locomotive or railway vehicle is caused to decelerate, the decelerometer 100 produces an output that is compared to previously programmed deceleration rates (not shown) provided to the processing unit 140. If the output of the decelerometer 100 is in agreement with the programmed deceleration rates provided to the processing unit 140, the locomotive or railway vehicle is permitted to continue to decelerate. If the locomotive or railway vehicle is decelerating at a lesser rate than is desired, the decelerometer responds in a linear fashion with an incremental measurement of the amount of rate of deceleration that is compared to the desire rate of deceleration. A preferred set of incremental measure is every tenth of a preferred measurement unit between a fixed set of parameters. If the deceleration rate that is indicated by the decelerometer 100 is not sufficient to satisfy the desired rate of deceleration, a penalty brake application is applied. The circuits are constantly checked by the processing unit during operation, thereby to satisfy vitality requirements.

It will be understood that various alterations and changes may be made by those skilled in the art without departing from the spirit and scope of the present invention. Therefore, it will be appreciated that certain modifications, ramifications, and equivalents will be readily evident to a skilled artisan and, accordingly, it is understood that the present invention is not to be limited to the disclosed environment and the exact embodiment shown and described, but should be afforded the full scope and protection of the appended claims.

What is claimed is:

1. A decelerometer for use in a vehicle, comprising:

exciting source means for supplying electrical energy;

sensor means responsive to said electrical energy for measuring a rate of acceleration and a rate of deceleration of said sensing means in a first direction and in an opposing second direction, wherein said sensing means provides first and second voltage outputs related to a degree of tilt from a level position;

processing means for processing said first and second voltage outputs in order to verify movement of said vehicle; and power interruption means, electrically connected to said processing means and said exciting source means, for cyclically removing and restoring electrical energy to said sensor means, wherein said processing means cyclically removes electrical energy from said sensor means and verifies that said first voltage output and said second voltage output is equal to zero according to a non-fault operating mode, and said processing means cyclically restores electrical energy to said sensor means and verifies that a summation of said first voltage output and said second voltage output is equal to a constant maximum value according to said non-fault operating mode.

2. The decelerometer according to claim 1, wherein said exciting source means further comprises:

a stable DC voltage regulator; and a function generator electrically connected to said stable DC voltage regulator, thereby to produce alternating current electrical energy.

3. The decelerometer according to claim 2, wherein said function generator operates at approximately 6000 Hertz.

4. The decelerometer according to claim 3, wherein said processing means further comprises:

first and second RMS-to-DC converting means for converting first and second voltage outputs, respectively, from alternating current to direct current;

first and second digital conversion means, electrically coupled to said first and second RMS-to-DC converting means, respectively, for converting said first and second voltage outputs, respectively, from said first and second voltage outputs to third and fourth digital outputs, respectively; and a central computer processing unit, electrically coupled to said first and second digital conversion means, to receive and process said third and fourth digital outputs.

5. The decelerometer according to claim 4, wherein said first and second digital conversion means includes an analog-to-digital converter having a voltage reference.

6. The decelerometer according to claim 5, wherein said analog-to-digital converter is set up for a −10 volt reference.

7. The decelerometer according to claim 6, wherein said analog-to-digital converter divides by 256.

8. The decelerometer according to claim 1, wherein said processing means further comprises:

first and second RMS-to-DC converting means for converting first and second voltage outputs, respectively, from alternating current to direct current;

first and second digital conversion means, electrically coupled to said first and second RMS-to-DC converting means, respectively, for converting said first and second voltage outputs, respectively, from said first and second voltage outputs to third and fourth digital outputs, respectively; and a central computer processing unit, electrically coupled to said first and second digital conversion means, to receive and process said third and fourth digital outputs.

9. The decelerometer according to claim 8, wherein said first and second digital conversion means includes an analog-to-digital converter having a voltage reference.

10. The decelerometer according to claim 9, wherein said analog-to-digital converter is set up for a −10 volt reference.

11. The decelerometer according to claim 10, wherein said analog-to-digital converter divides by 256.

12. A decelerometer for use in a railway vehicle, comprising:

sensor means for measuring a rate of deceleration of the vehicle, wherein a first voltage output is equal to a second voltage output when said sensor means is in a level position and has zero deceleration, and in response to said sensor means being tilted in a first direction from said level position, said first voltage output increases and said second output voltage output decreases in proportion to said rate of deceleration of the vehicle, and in response to said sensor means being tilted in a second direction which opposes said first direction from said level position, said first voltage output decreases and said second voltage output increases in proportion to said rate of deceleration of the vehicle;

processing means electrically connected to said sensor means for receiving and digitally processing said first and second voltage outputs in order to verify movement of said vehicle according to said measured rate of deceleration;

power supply means for supplying power to said sensor means and to said processing means; and power interruption means, electrically connected to said processing means and said power supply means, for cyclically removing and restoring power to said sensor means, wherein said processing means cyclically removes power from said sensor means and verifies that said first voltage output and said second voltage output is equal to zero according to a non-fault operating mode, and said processing means cyclically restores power to said sensor means and verifies that a summation of said first voltage output and said second voltage output is equal to a constant maximum value according to said non-fault operating mode.

13. The decelerometer according to claim 12, wherein said power supply means further comprises:
   a stable DC voltage regulator; and
   a function generator electrically connected to said stable DC voltage regulator, thereby to produce alternating current power.

14. The decelerometer according to claim 13, wherein said function generator operates at approximately 6000 Hertz.

15. The decelerometer according to claim 14, wherein said processing means comprises:
   first and second RMS-to-DC Converting means for converting first and second voltage outputs, respectively, from alternating current to direct current;
   first and second digital conversion means, electrically coupled to said first and second RMS-to-DC converting means, respectively, for converting said first and second voltage outputs, respectively, from said first and second voltage outputs to digital third and fourth outputs, respectively; and
   a central computer processing unit, electrically coupled to said first and second digital conversion means, to receive and process said third and fourth digital outputs.

16. The decelerometer according to claim 15, wherein said first and second digital conversion means includes an analog-to-digital converter having a voltage reference.

17. The decelerometer according to claim 16, wherein said analog-to-digital converter is set up for a −10 volt reference.

18. The decelerometer according to claim 17, wherein said analog-to-digital converter divides by 256.

19. The decelerometer according to claim 12, wherein said processing means comprises:
   first and second RMS-to-DC converting means for converting first and second voltage outputs, respectively, from alternating current to direct current;
   first and second digital conversion means, electrically coupled to said first and second RMS-to-DC converting means, respectively, for converting said first and second voltage outputs, respectively, from said first and second voltage outputs to digital third and fourth outputs, respectively; and
   a central computer processing unit, electrically coupled to said first and second digital conversion means, to receive and process said third and fourth digital outputs.

20. The decelerometer according to claim 19, wherein said first and second digital conversion means includes an analog-to-digital converter having a voltage reference.

21. The decelerometer according to claim 20, wherein said analog-to-digital converter is set up for a −10 volt reference.

22. The decelerometer according to claim 21, wherein said analog-to-digital converter divides by 256.

* * * * *